United States Patent Office 3,271,474
Patented Sept. 6, 1966

3,271,474
POLYMERIZATION PROCESS
Robert M. Engelbrecht, St. Louis, James M. Schuck, Webster Groves, and Robert G. Schultz, Vinita Park, Mo., assignors to Monsanto Company, a corporation of Delaware
No Drawing. Filed July 12, 1963, Ser. No. 294,744
8 Claims. (Cl. 260—683.15)

The present invention relates to the polymerization of polymerizable olefin hydrocarbons. More particularly, the present invention relates to an improved process for preparing linear low molecular weight polymers of polymerizable olefin hydrocarbons, to catalysts useful in such process and to a method of preparing said catalysts.

The use of catalysts comprised of carbon impregnated with cobalt for the polymerization of olefins is known to the art. Processes have been advanced for polymerizing low molecular weight normally gaseous olefins with a cobalt on charcoal catalyst prepared by heating carbon impregnated with a cobalt salt in a reducing atmosphere to reduce substantially all of the cobalt to the metallic state. Also, it is known to polymerize propylene with a cobalt on carbon catalyst obtained by treating the carbon with nitric acid prior to its impregnation with the cobalt. Some of the known processes involving polymerization of olefins in the presence of cobalt-on-carbon catalysts produce relatively high molecular weight polymers rather than such lower molecular weight polymers as dimers and trimers of the polymerizable olefins. Further, the polymer products have been found to contain a higher proportion of undesirable branched-chain polymers than straight-chain polymers which, of course, reduces the desirability of such processes in those utilities for which linear polymers are desired.

It is an object of the present invention to provide an improved process for the polymerization of polymerizable olefin hydrocarbons. Another object of the present invention is to provide improved catalyst compositions useful in the polymerization of polymerizable olefin hydrocarbons. Still another object of the present invention is to provide a method for preparing improved catalyst compositions useful in the polymerization of polymerizable olefin hydrocarbons. A particular object of the present invention is to provide an improved process for the polymerization of polymerizable olefin hydrocarbons to linear low molecular weight polymers. Another particular object of the present invention is to provide improved catalyst compositions useful in the polymerization of polymerizable olefin hydrocarbons to more linear low molecular weight polymers. Still another particular object of the present invention is to provide a method for preparing improved catalyst compositions useful in the polymerization of polymerizable olefin hydrocarbons to more linear low molecular weight polymers. Additional objects will become apparent from the following description of the invention herein disclosed.

The present invention, which fulfills the above objects, comprises contacting polymerizable olefin hydrocarbons with a catalyst prepared by treating an activated carbon supported cobalt containing catalyst with pyridines prior to activation of the catalyst.

In a particularly preferred embodiment, the present invention comprises contacting polymerizable olefin hydrocarbons with a catalyst prepared by (1) treating a carbon support with a non-oxidizing gas such as hydrogen, nitrogen, ammonia, helium, argon and the like, or a non-oxidizing liquid such as ammonium hydroxide, (2) impregnating the treated carbon support by contacting the support with a solution of a cobalt salt, (3) drying at a temperature of 100 to 200° C., (4) treating the dried cobalt salt impregnated carbon with ammonium hydroxide, (5) thereafter treating the ammonium hydroxide treated cobalt salt impregnated carbon with pyridine, and (6) activating the catalyst by heating to a temperature of 200 to 550° C. In this preferred embodiment steps 4 and 5 may be combined by treating the cobalt salt impregnated carbon with a mixture of ammonium hydroxide and pyridine which preferably contains no less than 2.5% by weight of pyridine. The present invention provides a process for polymerizing olefins and catalysts therefor as well as a method for preparing said catalysts, whereby there are obtained significant yields of lower molecular weight polymers, i.e., dimers and trimers, and substantially improved yields of more linear polymers.

The phrase "low molecular weight polymers" as used herein refers primarily to the dimers of the polymerizable olefins, but also includes the trimers of the polymerizable olefins.

The phrase "linear," as used herein in reference to the polymer product, refers to straight-chain.

To further describe as well as to illustrate the present invention, the following exemplification of its efficacy is presented. This example is in no manner to be construed as limiting the present invention.

Three catalysts were prepared in the same manner with the exception that two of the catalysts were treated with pyridine while the other was not. The catalysts prepared in accordance with the present invention will be referred to hereinafter as Catalysts A and B while the other catalyst will be referred to as Catalyst C.

Preparation of Catalyst A

To approximately 330 grams of a commercial grade (BPL) activated carbon was added approximately 300 mls. of a concentrated ammonium hydroxide. All of the ammonium hydroxide was absorbed. The ammonium hydroxide treated activated carbon was dried for approximately two hours at about 130° C. Next, the dried carbon was immersed in a solution of approximately 200 grams of cobalt nitrate hexahydrate in 250 mls. of demineralized water. The cobalt nitrate impregnated carbon was then dried at a low heat for approximately 3 hours until there was no visible liquid or water on the carbon and placed under vacuum for about 18 hours at a temperature of 120° C. The dried cobalt nitrate impregnated carbon was immersed in approximately 500 mls. of a concentrated ammonium hydroxide which was rapidly absorbed. This catalyst was then dried to visible dryness and placed under vacuum at 120° C. for 25 hours. The dried catalyst was then immersed in approximately 300 mls. of pyridine which was rapidly absorbed. The pyridine treated catalyst was then dried for 18 hours at 120° C. As a final step, the catalyst was activated by heating at a temperature of 275° C. in the presence of a nitrogen flow for 3 hours. This catalyst contained approximately 13.6% by weight of cobalt, calculated as cobalt oxide.

Preparation of Catalyst B

Catalyst B was prepared in the same manner as Catalyst A with the exception that the ammonium hydroxide and pyridine treatments after impregnation were combined into a single step. The dried cobalt nitrate impregnated carbon was immersed in approximately 500 mls. of a solution of concentrated ammonium hydroxide containing 10% by weight of pyridine. The catalyst was then dried and activated in the same manner as Catalyst A.

Preparation of Catalyst C

This catalyst was prepared in the same manner as Catalyst A with the exception that it was not treated with pyridine.

The efficacy of Catalysts A and B was demonstrated by carrying out three separate polymerization runs, one using Catalyst A, one using Catalyst B, and the other using Catalyst C. Propylene was used as the polymerizable olefin hydrocarbon in the polymerization runs. The conditions and results of the three polymerization runs are presented in the following table:

|  | Catalyst A | Catalyst B | Catalyst C |
|---|---|---|---|
| Conditions: |  |  |  |
| Temperatures, ° C | 35–100 | 50 | 45–100 |
| Pressure, p.s.i.g. | 720 | 700 | 720 |
| Space Velocity, g. feed/g. cat./hr. | 1.0–1.1 | 1.2 | 1.2–1.3 |
| Results, Percent by Wt. of Liquid Product: |  |  |  |
| Dimer Fraction | 93 | 91 | 94 |
| Above Dimers | 7 | 9 | 6 |
| Results, Percent by Wt. of Dimer Fraction: |  |  |  |
| n-Hexenes | 79 | 81 | 60 |
| Iso-Hexenes | 21 | 19 | 40 |

The above example clearly demonstrates the efficacy of the present invention in regard to the production of low molecular weight polymers and especially in regard to the production of linear polyolefins. As is noted above, all three catalysts produce relatively high yields of the low molecular weight polymers, i.e., dimers. However, Catalysts A and B, the catalysts of the present invention, produce substantially greater yields of the linear polymers than does Catalyst C. Approximately 56.4 weight percent of the liquid product of Catalyst C is n-hexenes whereas with Catalysts A and B the liquid product contained 73.5 and 73.7 weight percent n-hexenes, respectively.

The base supports useful in the catalysts of the present invention are activated carbons. These activated carbons may be any porous carbon known to be useful for catalyst preparation. The activated carbons generally have surface areas of about 200 to 2000 square meters per gram, preferably 300 to 1500 square meters per gram, and may be in the form of compact masses, granulars, chips, powders, etc. These include coconut charcoal, wood charcoal, coke derived from coal, soft bone charcoal, hard bone charcoal, and the like. The activated carbon may be obtained from animal, vegetable or petroleum sources and may include such commercial materials as Pittsburgh "BPL," "CAL," "OL," and "SGL" produced by Pittsburgh Coke and Chemical Co., Girdler "G–32–C," and "G–32–E" produced by Chemical Products Division, Chemetron Corp., and Barnebey-Cheney Company's "EE–1" and "E–H–1."

The activated carbons used as catalyst supports in the present invention may be either washed or unwashed. If washed, a preferred method of washing comprises treating the carbon with an aqueous nitric acid. In using this preferred washing agent it is generally preferred to use approximately 600 to 1000 mls. of nitric acid for 500 mls. of carbon. Though the nitric acid may be virtually any concentration, it is preferred that it be of a concentration of about 10 to 30% in water. The carbon will generally be treated with nitric acid for from 2 to 10 minutes with 3 to 5 minutes generally being sufficient. After the acid washing, the carbon may be washed with water and if desired, dried. Generally, the carbon is water washed until the wash water is substantially neutral (pH 5.0–7.0).

The activated carbon, after completing the acid washing, if used, is treated with a non-oxidizing gas or liquid. The non-oxidizing gases are characterized by such gases as nitrogen, hydrogen, ammonia, helium, argon and the like. The non-oxidizing liquids are particularly characterized by such compounds as ammonium hydroxide. If a non-oxidizing gas is used, it is passed into contact with the activated carbon for 1 to 24 hours at temperatures ranging from 250 to 550° C. If a non-oxidizing liquid is used, it is contacted with the activated carbon until the carbon has completely absorbed and/or adsorbed its maximum amount of the liquid. Any non-oxidizing gas such as a hydrogen, nitrogen, ammonia, helium, argon and the like may be used with hydrogen, nitrogen and ammonia being preferred. Generally, the non-oxidizing liquid is ammonium hydroxide. With ammonium hydroxide, a concentration of from 15 to 30% by weight is generally preferred though more dilute solutions may be used. If the carbon is treated with ammonium hydroxide it is necessary to subsequently dry the carbon. Drying may be carried out by heating at temperatures of approximately 100 to 200° C. for 2 to 24 hours with temperatures of 120 to 150° C. being preferred.

After the above step is complete, the carbon is impregnated with a solution of a cobalt salt. The cobalt salts are those decomposable to the oxide and are exemplified by the following non-limiting examples: Cobalt acetate, cobalt formate, cobalt sulfate, cobalt nitrate, cobalt butanoate, cobalt pentanoate, cobalt hexanoate, cobalt ammonium sulfate, cobalt arsenate, cobalt arsenite, cobalt carbonate, cobalt chromate, cobalt vanadate, cobalt molybdate, cobalt iodate, cobalt oxalate, cobalt citrate, cobalt sulfite. The most useful cobalt salts are cobalt acetate, cobalt sulfate and cobalt nitrate in the cobaltous form with cobalt nitrate being preferred. The cobalt salt solution is preferably an aqueous solution though other solvents for the cobalt salts may be used. The cobalt salt solution is one having a concentration calculated to give the desired amount of cobalt oxide on the carbon when activated. Impregnation may be carried out by immersing the catalyst particles of the carbon in the cobalt salt solution or by "moistening the carbon with the solution." After the impregnation, the cobalt salt treated carbon is then dried, preferably from 1 to 24 hours at a temperature of from approximately 100° C. to 200° C. Temperatures for drying of 120° C. to 150° C. for 5 to 24 hours are preferred. This drying step is necessary to decomposed the cobalt salt to the cobalt oxide.

At this point in the preparation of the catalyst of the present invention, the cobalt impregnated carbon is subjected to treatment with ammonium hydroxide followed by pyridine or by treatment with an ammonium hydroxide-pyridine mixture. In the first procedure, ammonium hydroxide treatment followed by pyridine treatment, the carbon is either immersed or moistened with an amount of ammonium hydroxide such that no more will be absorbed or adsorbed into the carbon. It will generally be preferred that the ammonium hydroxide be a concentrated ammonium hydroxide of from 15 to 30% by weight concentration although more dilute ammonium hydroxide solutions may be used. At this point, the catalysts may or may not be dried. No particular advantage has been found to result from drying. The catalyst is next moistened with pyridine until thoroughly wetted. After the pyridine treatment, the catalyst is dried for 1 to 24 hours at a temperature of 110° C. to 150° C. The alternative method of treating the catalyst by using a mixture of ammonium hydroxide and pyridine comprises immersing or thoroughly wetting the catalyst with an ammonium hydroxide-pyridine solution containing at least 2.5% by weight of pyridine. Upon completion of the ammonium hydroxide-pyridine solution treatment, the catalyst is dried in the manner described above.

Activation of the catalyst mass for use as a polymerization catalyst will generally be carried out by heating the catalyst to temperatures above approximately 200° C., but not in excess of about 550° C. The preferred activation temperatures are within the range of approximately 200° C. to 300° C. Activation of the catalyst composition is preferably conducted in the presence of an inert gas such as nitrogen, helium, methane, propane, carbon dioxide, or in a vacuum atmosphere. The catalyst may also be activated in the presence of air until the desired temperature is reached and then the air flushed from the catalyst and replaced with an inert gas for a short time period lasting until the termination of the activation treatment. With the above conditions, activation may generally be accomplished within 0.5 to 10 hours. Preferably, the activation time will range from 2 to 5 hours. It is, of course, within the scope of the present invention to combine the drying step which follows pyridine treatment of the catalyst with the activation step just described. However, the catalyst should at least be partially dried prior to activation to alleviate the possibility of explosive decomposition at activation temperatures.

It is preferred that the finished activated catalyst not be contacted with air. If, however, the catalyst is exposed to air in an amount sufficient to cause any deactivation, the catalyst may be readily reactivated by the above described method.

The amount of cobalt present in the catalyst of the present invention may range from approximately 0.5 to 30% by weight, calculated as its oxide, of the catalyst. It is preferred, however, that the amount of cobalt be from 5 to 25% by weight, calculated as its oxide, of the total catalyst.

The polymerization process of this invention is operated at temperatures ranging from approximately −10 to 200° C., but preferably at temperatures ranging from 10 to 100° C. The pressures at which the present invention is operable may range from atmospheric to 2500 p.s.i.g. It is preferred, however, that pressures of from 100 to 1000 p.s.i.g. be used. The space velocity of the reactants in the present process may range from 0.1 to 50 parts by weight of feed per part by weight of catalyst per hour, but preferably from 1.0 to 20.0 parts by weight of feed per part by weight of catalyst per hour.

Virtually any polymerizable olefin may be polymerized according to the present invention. Generally, such olefins may contain from 2 to 20 carbon atoms and are preferably mono-olefin hydrocarbons. The preferred use of the present invention is in the polymerization of mono-olefin hydrocarbons containing from 2 to 8 carbon atoms. Non-limiting examples of such hydrocarbons are ethylene, propylene, butylene, pentylene, iso-pentylenes, hexenes, iso-hexenes. Preferably, these mono-olefin hydrocarbons are those that are terminally unsaturated. The present invention is most useful for the polymerization of mono-olefin hydrocarbons of 2 to 4 carbon atoms, i.e., ethylene, propylene, terminally unsaturated butylene and mixtures thereof. The polymerizable olefin hydrocarbon feed of the present invention need not be a pure feed stream, but will generally contain no less than 20 mol percent polymerizable olefins. This limitation is primarily one of commercial practicality, however, rather than operability. Impurities which may be tolerated in the feed to the present process may include saturated hydrocarbons such as n- and iso-paraffins and the like. Di-olefins, triolefins and acetylenes are to be avoided in the feed since such unsaturated compounds tend to poison the present catalyst.

The type of reaction equipment used in the process of the present invention is not critical. Any conventional polymerization equipment may be used. The polymerization process may be operated as a batch operation or as a continuous or semi-continuous flow system. The catalyst and polymerizable olefin hydrocarbons may be contacted in a counter-current, cross-current or co-current flow. It is only important that polymerization equipment and the arrangement of apparatus be consistent with good engineering principles.

What is claimed is:
1. A process for the polymerization of polymerizable terminally unsaturated olefin hydrocarbons which comprises contacting said hydrocarbons with a catalyst comprised of an activated carbon supported cobalt oxide, said catalyst having been prepared by (1) treating an activated carbon support with a material selected from the group consisting of a non-oxidizing gas and ammonium hydroxide, (2) impregnating the treated carbon support by contacting said support with a solution of a cobalt salt, (3) drying the catalyst mass at a temperature of 100 to 200° C., (4) treating the dried cobalt impregnated carbon with ammonium hydroxide, (5) treating the ammonium hydroxide treated cobalt impregnated carbon with pyridine, (6) drying the pyridine treated ammonium hydroxide treated cobalt impregnated carbon, and (7) activating the catalyst at a temperature of 200 to 550° C. and in the presence of an inert gas.

2. The process of claim 1 wherein the non-oxidizing gas is selected from the group consisting of nitrogen, hydrogen, and ammonia.

3. The process of claim 1 wherein the temperature of activation is 200 to 300° C.

4. The process of claim 1 wherein steps 4 and 5 are combined by treating the dried cobalt impregnated carbon with an ammonium hydroxide-pyridine solution containing at least 2.5% by weight of pyridine.

5. The process of claim 1 wherein the polymerizable olefin hydrocarbons are contacted with the catalyst at a temperature of −10 to 200° C. and a pressure of atmospheric to 2500 p.s.i.g.

6. The process of claim 1 wherein the polymerizable olefin hydrocarbons are contacted with the catalyst at a temperature of 10 to 100° C. and a pressure of 100 to 1000 p.s.i.g.

7. The process of claim 1 wherein the polymerizable olefin hydrocarbons are mono-olefin hydrocarbons of 2 to 8 carbon atoms.

8. A catalyst composition comprised of an activated carbon impregnated with cobalt oxide, said catalyst prepared by (1) treating an activated carbon support with a material selected from the group consisting of a non-oxidizing gas and ammonium hydroxide, (2) impregnating the carbon support by contacting said support with a solution of a cobalt salt, (3) drying the catalyst mass at a temperature of 100 to 200° C., (4) treating the dried cobalt impregnated carbon with ammonium hydroxide, (5) treating the ammonium hydroxide treated cobalt impregnated carbon with pyridine, (6) drying the pyridine treated ammonium hydroxide treated cobalt impregnated carbon, and (7) activating the catalyst at a temperature of 200 to 550° C. and in the presence of an inert gas.

References Cited by the Examiner
UNITED STATES PATENTS

| | | | |
|---|---|---|---|
| 2,460,303 | 2/1949 | McAllister | 260—683.15 |
| 2,599,249 | 6/1952 | Friedman | 260—683.15 |
| 2,692,261 | 10/1954 | Peters et al. | 260—683.15 |
| 2,692,295 | 10/1954 | Peters | 260—683.15 |

OTHER REFERENCES

Mellor, Comprehensive Treatise on Inorganic and Theoretical Chemistry, vol. 14, Longmans, Green & Co., N.Y., 1935, pages 584–586.

DELBERT, E. GANTZ, *Primary Examiner.*

R. H. SHUBERT, *Assistant Examiner.*